United States Patent [19]

Sternklar

[11] Patent Number: 5,420,875
[45] Date of Patent: May 30, 1995

[54] STEERING OF LASER BEAMS

[75] Inventor: Shmuel Sternklar, Rehovot, Israel

[73] Assignee: The State of Israel, Atomic Energy Commission, Soreq Nuclear Research Center, Yavne, Israel

[21] Appl. No.: 58,634

[22] Filed: May 6, 1993

[30] Foreign Application Priority Data

May 6, 1992 [IL] Israel ..................... 101793

[51] Int. Cl.$^6$ ............................. H01S 3/10
[52] U.S. Cl. ......................... 372/9; 372/27; 372/69; 372/97; 372/102
[58] Field of Search .............. 372/9, 27, 102, 69, 372/97

[56] References Cited

U.S. PATENT DOCUMENTS

| | | | |
|---|---|---|---|
| 4,707,584 | 11/1987 | Kimbara | 372/27 |
| 4,930,133 | 5/1990 | Babbitt et al. | 372/9 |
| 5,048,030 | 9/1991 | Hiiro | 372/97 |

Primary Examiner—Georgia Y. Epps
Attorney, Agent, or Firm—Helfgott & Karas

[57] ABSTRACT

A method of deflecting and steering laser beams of the kind that comprises generating two converging pumping beams defining between them a convergence angle $\psi$. The two converging pumping beams are targeted on a predetermined intersection region of a third-order, non-linear polarization medium so as to intersect therein whereby each of said pumping beams is split in the said intersection region to form a plurality of scattered portions each of which interferes with the pumping beam from which it was formed to generate a light interference pattern, the light interference patterns thus generated from the two pumping beams causing self-generation of a common grating such that there emerge from said polarization medium two output beams each forming with a neighboring pumping beam a steering angle $\Theta$ which is controllable by variation of the magnitude of the wavenumber of at least one of the two pumping beams so as to form a wavenumber difference $d\bar{k}$ between the two pumping beams. In accordance with the invention wavenumber difference is obtained by the controlled variation of either or both of a refractive index $n'$ and absorption index $n''$ associated with at least one of the pumping beams.

24 Claims, 4 Drawing Sheets

STEERING OF LASER BEAMS

FIELD OF THE INVENTION

The present invention relates to a method and apparatus for deflecting and steering laser beams. More specifically, the present invention concerns optical systems for coupling and mixing two pumping laser beams directed into a third-order, non-linear polarization medium whereby two output beams are produced each of which forms a controllable angle with the neighboring input beam, such angle to be referred to hereinafter as "steering angle". Such systems are useful for a variety of applications, e.g. scanning an optical disc, guiding a laser beam in a laser printer, laser etching of high resolution patterns, and others. The beams may also have spatial and temporal modulation and the invention may, therefore, be used in cases where such modulation is required, e.g. in image color conversions and interconnection of laser beams for optical communication.

The invention is also useful for a variety of military applications such as range finding, multi-target designation and guidance, and others.

BACKGROUND OF THE INVENTION

The following is a list of publications disclosing methods and apparatus for beam steering and for mixing and coupling of laser beams in photorefractive media:

(1) "Electro-Optic and Acousto-Optic Scanning and Deflection", M. Gottlieb, C. L. M. Ireland and J. M. Ley, Optical Engineering, Vol. 3 (1983), Marcel Dekker, Inc., New York and Basel;

(2) "Laser Scanning and Recording: Developments and Trends", Leo Beiser, Laser Focus/Electro-Optics, Feb. 1985 pps 88–96;

(3) "Opto-Optical Light Deflection", G. T. Sincerbox and G. Roosen, Appl. Optics 22, 690 (1983);

(4) "Dynamic Beam Deflection Usxing Photorefractive Gratings in BSO Crystals", G. Pauliat, J. P. Herriau, G. Roosen and J. P. Huignard, J. Opt. Soc. Am. B3, 306 (1986);

(5) U.S. Pat. No. 4,869,579;

(6) "Self Bragg matched beam steering using the double-color pumped photorefractive oscillator", Appl. Phys. Lett. 51, 74 (1987);

(7) "Photorefractive Oscillators", B. Fischer, S. Sternklar, S. Weiss, IEEE J. Quant. Electron 25, 550 (1989);

(8) "Beam Coupling and Locking of Lasers using Photorefractive 4 Wave Mixing", S. Sternklar, S. Weiss, M. Segev and B. Fischer, Opt. Lett. 11, 528 (1986), made the subject of commonly-owned Israel patent application No. 79581, filed Jul. 31, 1986 and incorporated herein by reference;

(9) "Phase-conjugate Nd: YAG laser with internal acousto-optic beam steering", J. L. Aycol, J. Montel, T. Verny and J. P. Huignard, Opt. Lett. 16, 1225 (1991); and

(10) "High-power beam steering using phase conjugation through Brillouin-induced four-wave mixing", D.C. Jones, G. Cook, K. D. Ridley and A.M. Scott, Opt. Lett. 16, 1551 (1991).

The prior art includes mechanical (mirror scanning), acousto-optic and electro-optic methods and apparatus for beam steering.

Mechanical methods have the disadvantages of being bulky, slow and relatively inaccurate (e.g. susceptible to vibrations and flutter). Acousto-optic crystals are widely used. However their maximum steering angle is about ±2°, limited by the Bragg Condition. In addition, their use is limited to low power continuous wave (CW) beams due to the trade-off between access time and beam diameter in these devices, which dictates the use of focused beams in the acousto-optic crystal. Due to use of focused beams they must have low power in order to prevent damage. This imposes a trade-off between the deflection resolution of these devices and their access time.

Refs. 3 and 4 disclose a complex technique based upon photorefractive wave mixing for overcoming the Bragg condition. This technique requires a relatively large amount of wavelength tuning, of the order of 5%, to achieve angular steering of about 12°.

U.S. Pat. No. 4,869,579 and related Refs. 6–8 disclose an improved system and method of steering two pumping beams with demonstrated steering angles of about ±3°, based on automatic Bragg matching and in which the input pumping beams may have different wavelengths. In accordance therewith the two incident pumping beams impinge on two sides of a third order, non-linear photorefractive polarization medium and have a predetermined alignment and spatial overlap in the interaction region of the polarization medium at which they are coupled and self-diffracted. Each of the two incident pumping beams generates a self-diffracted mate and defines together therewith a beam couple. The beam couples produced from the two incident pumping beams are operative to write a common grating in the photorefractive polarization medium such that there emerge from the medium two steered output beams with controllable offset angles, and optionally with spatial and temporal modulation.

Controlling the steering angle $\Theta$ in accordance with U.S. Pat. No. 4,869,579 is based on changing the wavelength $\lambda$ of one pumping beam relative to the other. In case $\lambda$ of the two pumping beams is a priori the same, the steering angle $\Theta$ within the non-linear medium obeys the formula:

$$\theta = -\frac{\sin\psi \cdot d\lambda}{\lambda} \qquad (I)$$

where $\psi$ is the angle between the two input pumping beams within the non-linear medium to be referred to hereinafter as "convergence angle", and $d\lambda$ is the difference in wavelength $\lambda$ between the two input pumping beams resulting from wavelength modulation. The above formula is an approximation which assumes exclusively obtuse convergence angles of up to nearly 180°; and $$\frac{d\lambda}{\lambda} \ll 1$$

so that $\Theta < 1$ Rad.

Generally, the convergence and output angles outside the medium will be different than inside the medium due to the Fresnel refraction at the medium/ambient interface with the exception of those cases in which the Fresnel refraction valve is 1. Hereinafter, the terms convergence and output angles are meant to refer to the occurrence within the medium.

Although the system and method of U.S. Pat. No. 4,869,579 and other photorefractive methods overcomes some drawbacks of the state of the art at that time, it still has several intrinsic limitations. For one, although U.S. Pat. No. 4,869,579 mentions that steering occurs in consequence of variations of the wavenumber $\bar{k}$ the only available parameter for control is the wavelength $\lambda$, and as relatively large variations $d\lambda$ are required due to the small value of $\sin\psi$ ($d\lambda/\lambda \approx 0.1$), the steering is not sufficiently flexible. Therefore, the very nature of the system and method according to the U.S. patent implies that to achieve large enough $d\lambda$ the steering is achieved either by bulky and slow mechanical means or by sophisticated acousto-optical or electro-optic means, which latter are expensive and not readily available and increase radically the cost of the entire system to an extent which, from a commercial point of view, may be prohibitive.

Still further, the system and method of U.S. Pat. No. 4,869,579 are unsuitable for the steering of high intensity beams and in consequence many military and civilian applications are excluded.

It is the object of the present invention to provide improved system and method for steering and deflecting laser beams that will overcome the above drawbacks.

BRIEF DESCRIPTION OF THE INVENTION

In accordance with one aspect of the invention there is provided a method of deflecting and steering laser beams of the kind that comprises generating two converging pumping beams defining between them a convergence angle $\psi$, targeting said two converging pumping beams on a predetermined intersection region of a third-order, non-linear polarization medium so as to intersect therein whereby each of said pumping beams is split in the said intersection region to form a plurality of scattered portions each of which interferes with the pumping beam from which it was formed to generate a light interference pattern, the light interference patterns thus generated from the said two pumping beams causing self-generation of a common grating such that there emerge from said polarization medium two output beams each forming with a neighboring pumping beam a steering angle $\Theta$ which is controllable by variation of the magnitude of the wavenumber of at least one of said two pumping beams so as to form a wavenumber difference $d\bar{k}$ between said two pumping beams; characterized in that the said wavenumber difference is obtained by the controlled variation of either or both of a refractive index $n'$ and absorption index $n''$ associated with at least one of the pumping beams.

The refractive index $n'$ and the absorption index $n''$ are, respectively, the real and imaginary components of the complex refractive index $n$.

The wavenumber difference $d\bar{k}$ is obtainable by varying $n'$ and/or $n''$ of one of the pumping beams or of both.

The invention also provides a system for the performance of the above method.

The invention thus affords a departure from the teachings in U.S. Pat. No. 4,869,579 according to which the modulation of the wavenumber $\bar{k}$ is proportional to the modulation of the wavelength $\lambda$ only, $$\frac{d\bar{k}}{\bar{k}} = \frac{d\lambda}{\lambda} \qquad (II)$$

as manifested by the arrangement of in FIG. 1 therein.

The means required to sufficiently vary either or both of $n'$ and $n''$ cover a broader technological base and are significantly more flexible than those required in accordance with the prior art for sufficient varying of $\lambda$. In consequence, the present invention makes it possible to achieve at least the same steering angle $\Theta$ as in accordance with the prior art with the use, however, of significantly more flexible, cheaper and at the same time more accurate control means.

By one embodiment of the present invention, the means to vary either or both of $n'$ and $n''$ are an electric field applied to the said third-order, non-linear polarization medium to induce anistropy or enhance an intrinsic anisotropy.

By another embodiment the said means is a magnetic field applied to the medium to induce or enhance anisotropy.

By yet another embodiment for forming a wavenumber difference $d\bar{k}$, the polarization of one pumping beam is changed relative to its mate pumping beam, by any suitable conventional polarize means, e.g. a wave plate polarizer, said polarizer means may be located outside the medium so that the pumping beam passes through it prior to entering the intrinsicly or induced anisotropic medium, or may be located within the medium.

By a still further embodiment, either or both of $n'$ and $n''$ associated with one or both pumping beams is varied by modifying the light intensity of one pumping beam relative to the other, by changing the intensity itself or by using an additional, external light source.

Still further, another embodiment for forming $dk$ is a stress applied to the non-linear polarization medium so as to strain the medium and cause birefringence.

As will be readily understood by those skilled in the art, other modulation means may be employed for varying $n'$ and/or $n''$ of the modulated pumping beam in order to steer the output beams, and more than one of any such means may be used simultaneously. It should also be understood that one or more of the said modulation means may be applied simultaneously to both pumping beams to obtain a relative change of either or both of $n'$ and $n''$. For example, the light intensity of one pumping beam may be increased and at the same time the light intensity of its mate beam be attenuated, thereby increasing the relative variation of intensity.

It has also been found in accordance with the present invention that for selected wavelengths of the pumping beams, either or both of $n'$ and $n''$ may be modulated significantly by small variation in $\lambda$, in a manner not foreshadowed by the prior art. Such selected wavelength is a wavelength at which the frequency of the pumping beams is substantially near the resonant band edge of the said third-order, non-linear polarization medium. In such a situation, a relatively small wavelength difference $d\lambda$ between the pumping beams will cause considerable variation of either or both of $n'$ and $n''$ associated with at least one pumping beam, giving rise to the formation of a wavenumber difference $d\bar{k}$ and a change of the steering angle $\Theta$ whereby the output beams are steered.

Thus, by another aspect the invention provides a method and system of the kind specified wherein the wavelength of at least one of the pumping beams is so selected that the frequency thereof is substantially near a resonant band-edge of said third-order, non-linear polarization medium and a wavenumber difference $d\bar{k}$ is formed by a wavelength shift of the said at least one pumping beam to give rise to a small wavelength difference $d\lambda$ between the two pumping beams.

It should be noted that some of the means disclosed hereinbefore for varying the refractive index n were also mentioned in U.S. Pat. No. 4,869,579, however in a different context and for different purposes. Thus, in the exclusive context of wavelength modulation it is mentioned in the U.S. Patent that an electrical field may be applied. However, the provision of an electric field in accordance with the U.S. patent aims at controlling the coupling constant γ in a limited group of crystals used as third-order, non-linear polarization medium known as photorefractive crystals. Contrary thereto, in the present invention the steering means such as an electrical field, are applicable to any third order non-linear polarization medium.

The U.S. patent also mentions modulations of the light intensity, the polarization and the degree of isolation. However, the effects which such modulations are meant to produce have nothing to do with steering or induced anisotropy.

As mentioned hereinbefore, for large, obtuse convergence angle $\psi$ of up to nearly 180°, the deflection angle $\Theta$ obeys the formula:

$$\theta = -\frac{(\sin\psi) \cdot d\lambda}{\lambda} \quad (I)$$

In departure therefrom it has now been found in accordance with the invention, that superior results are obtained by selecting an acute convergence angle $\psi$, preferably of the order of up to 10°, and that in such cases the steering angle $\Theta$ obeys the formula:

$$\theta = \frac{2}{\sin\psi} \cdot \frac{d\bar{k}}{\bar{k}} \quad (III)$$

Thus, by yet another aspect of the invention there is provided a method for deflecting and steering laser beams of the kind that comprises generating two converging pumping beams defining between them a convergence angle $\psi$, targeting said two converging pumping beams on a predetermined region of a third-order, non-linear polarization medium so as to intersect therein whereby each of said input pumping beams is split in the said intersection region to form a plurality of scattered portions each of which interferes with the pumping beam from which it was formed to generate a light interference pattern, the light interference patterns thus generated from the said two pumping beams causing self-generation of a common grating such that there emerge from said polarization medium two diverging output beams each forming with a neighbouring pumping beam a steering angle $\Theta$ which is controllable by a wavelength shift to produce a wavelength difference $d\lambda$ and thereby a wavenumber difference $d\bar{k}$ between the two pumping beams, characterized in that said convergence angle $\psi$ is acute and the wavelength shift does not exceed 0.5%.

As can be clearly observed by comparing with each of the formulae (I) and (III), the amplification factor $|\sin\psi|$ in formula (I) has an upper limit of 1 which means that it is actually an attenuating factor, whereas in formula (III) the amplification factor $$\left|\frac{2}{\sin\psi}\right|$$

has a lower limit of 2 and is thus a true amplification factor. When a small converging angle $\psi$ is selected, say 0.5°, the amplification factor according to formula (III) may be as much as three orders of magnitude larger than according to formula (I). The possibility which is thus provided to use a small convergence angle $\psi$, affords a significant advantage since in this way the output beams may perform large angular sweeps by only small variations of $\lambda$. This enhanced sensitivity is demonstrated below.

This aspect of the invention constitutes a significant advantage over the prior art since for small modulations of $\lambda$ electro-optical steering means may be employed, e.g. tunable semiconductor laser diodes, which are both cheaper and far more accurate than the prior art means required for effecting relatively large changes of $\lambda$. Due to the high accuracy of the electro-optical steering means it is possible to achieve high resolutions and accurate steering and to obtain a predetermined discrete variation of the steering angle $\Theta$ with a high degree of accuracy, which is essential in all those applications where accurate scanning of discrete sections in a broad field is desired.

It was furthermore found in accordance with the invention that the maximum steering angle $\Theta_{MAX}$ is related to the convergence angle $\psi$ by the expression:

$$\Theta_{MAX} = 180° - \psi \quad (IV)$$

In practice, this expression is valid only for large variations in the magnitude of the wavenumber $\bar{k}$, e.g. of the order of 10%. With this limitation, the smaller convergence angle $\psi$ the larger is the maximum steering angle $\Theta$ which is a further reason for selecting a small convergence angle $\psi$.

It was further found in accordance with the invention, that variation of n' and/or n" may be utilized for high power beam steering by means of a third-order, non-linear polarization medium having high damage threshold that is characterized by a fast time response of up to the order of 100 nsec for the self-generation of a common grating.

Common methods for steering high power laser beams are based on scanning mirrors or acousto-optics, the latter comprising a two-stage operation in the first of which low power beams are steered and the steered low power output beams are then amplified to become high power beams. This method is bound by the Bragg condition and therefore the steering range is limited to the order of ±2°, as disclosed in Refs. 9 and 10 above.

Against this, high power laser beam steering according to the present invention enables to obtain steering angles in the range of 10° which provides a significant advantage over and departure from the prior art. It was found, for example, that by selecting an organic liquid medium which has a high damage threshold of the order of 100 MW cm$^{-1}$ and fast time response of the order of 1 nsec, high power pumping beams of 1 MW each could be steered over steering angles $\Theta$ in the range of 10°.

By one embodiment of the invention at least one of said input pumping beams carries spatial and temperal modulation, a portion of which is also carried by at least one of said output beams. By modification of this embodiment, the color of the output beam carrying said spatial modulation is that of its mate input pumping beam.

BRIEF DESCRIPTION OF THE DRAWINGS

For a better understanding the invention will now be described, by way of example only, with reference to the accompanying drawings to which it is not limited. In the drawings.

Figure 2:
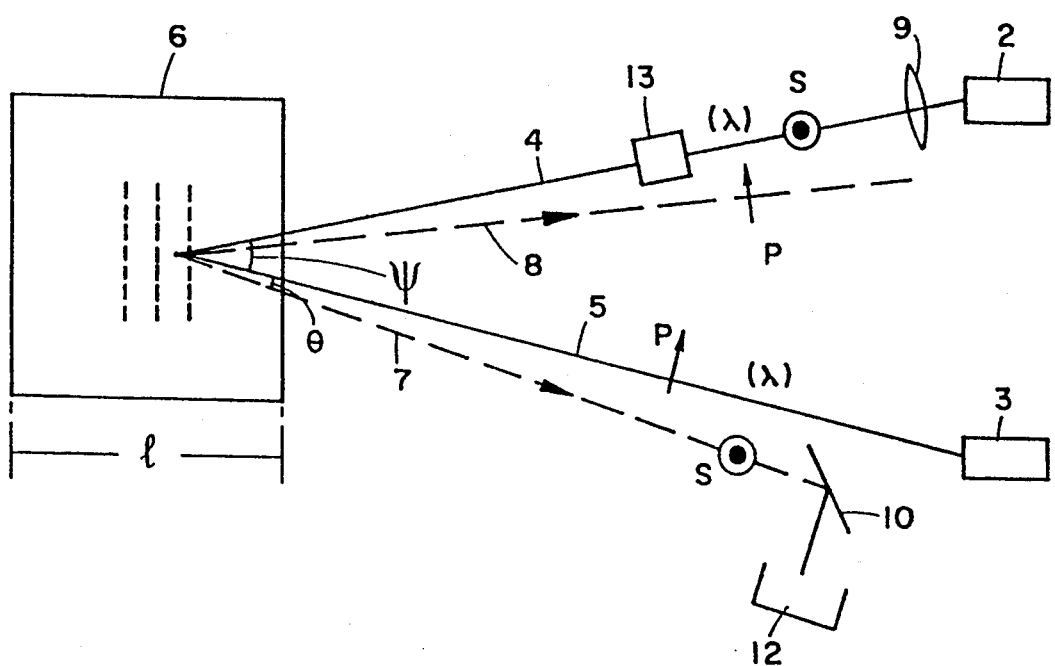
FIG. 2 is a diagrammatic illustration of a laser beam steering system according to another embodiment of the invention in which the pumping beams form an acute convergence angle.
Figure 3A:
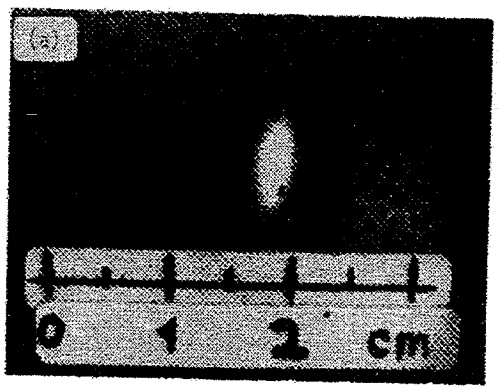
FIGS. 3a–3d are each an enlarged picture of a spot produced by a steered output beam, for various small modulations of $\lambda$ in the system of FIG. 2.
Figure 3B:
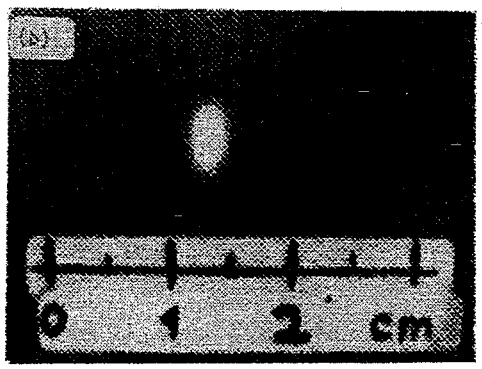
Figure 3C:
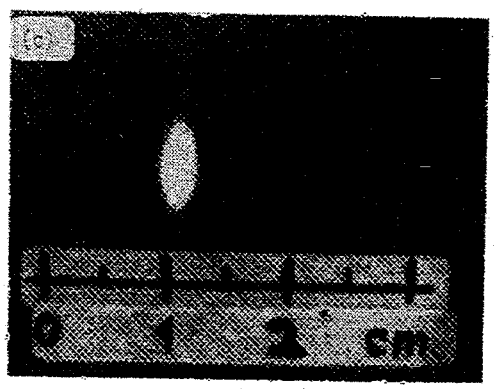
Figure 3D:
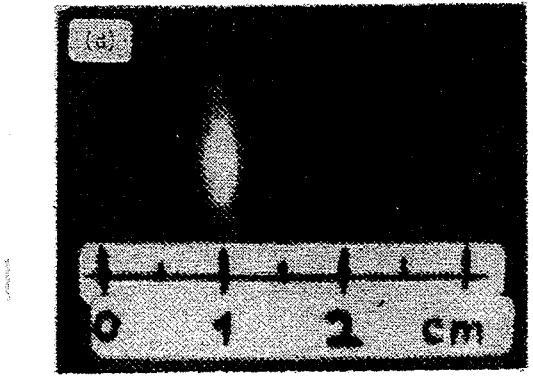
Figure 5:
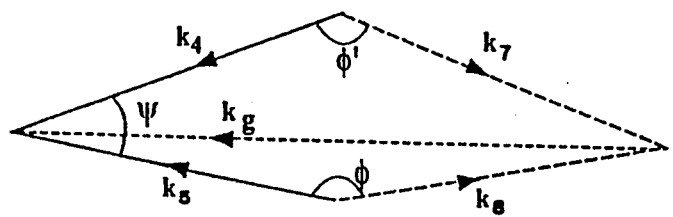
Figure 6:
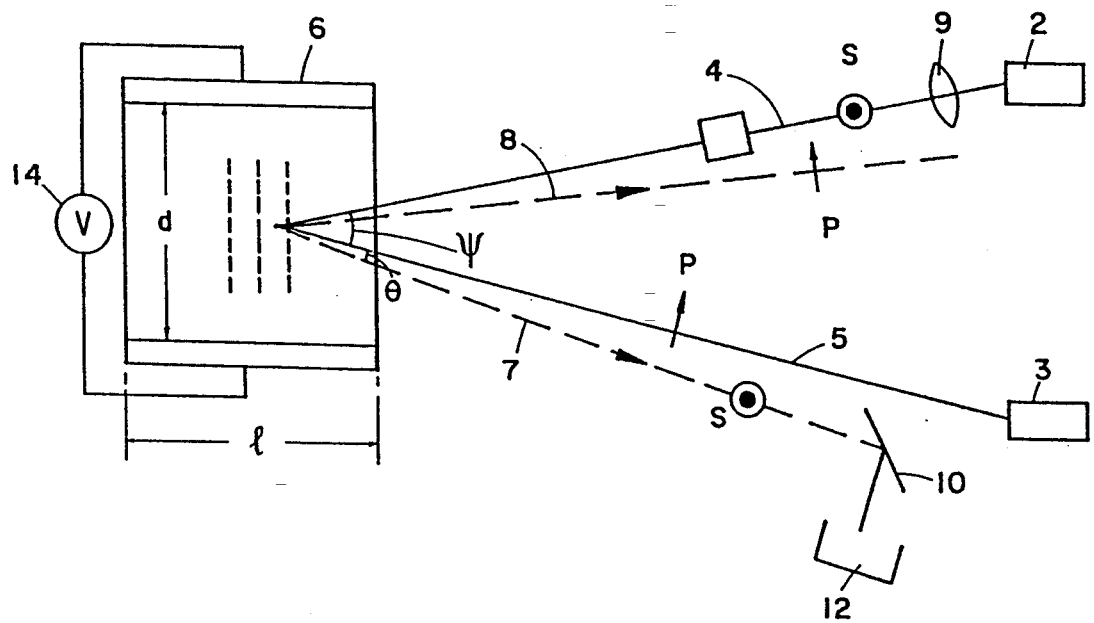

obtained for small $d\lambda$ with a system according to FIG. 2;

FIG. 5 is a $\bar{k}$-vector diagram of the pumping beams and the gratings shown in FIG. 2; and FIG. 6 is a diagrammatic illustration of a system according to FIG. 2 with an applied electric field.

DESCRIPTION OF A SPECIFIC EMBODIMENT

Figure 1:
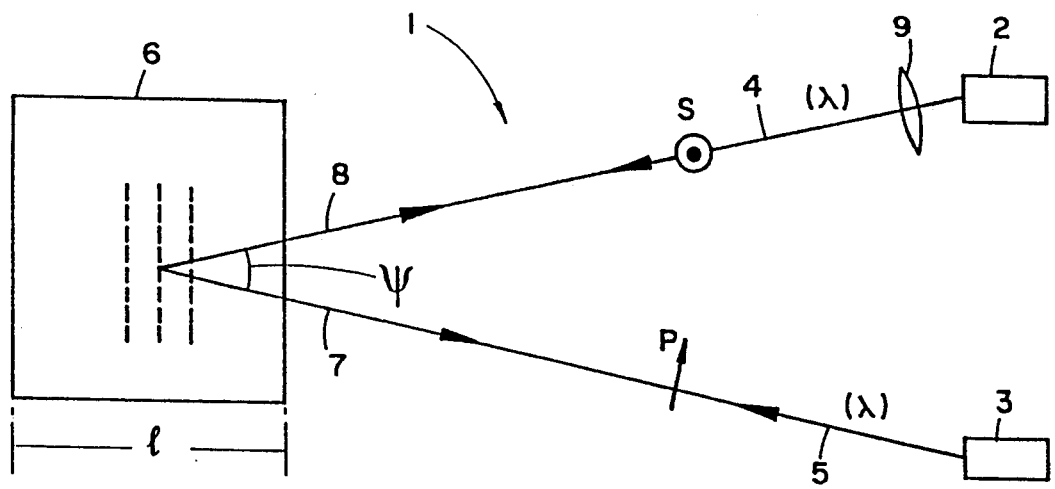
FIG. 1 is a diagrammatic illustration of a laser beam steering system according to one embodiment of the invention in which the pumping beams form an acute convergence angle.

Attention is first directed to FIG. 1 showing a system 1 comprising laser source 2 and 3 producing pumping beams 4 and 5 of wavelength $\lambda$. Pumping beams 4 and 5 target an intersection region in a third-order, non-linear polarization medium 6 in which they intersect. Diverging output beams 7, 8 are generated in the intersection region due to the Brillouin fourwave mixing process, and they emerge from the medium with a zero offset angle. Similarly as in U.S. Pat. No. 4,869,579, a common grating is supported both by the interference of pumping beam 4 with its scattered portion forming a first output of beam 7, and the interference of pumping beam 5 with its scattered portion forming a second output beam 8. Also similar as in U.S. Pat. No. 4,869,579, the Bragg matching condition is always automatically fulfilled.

Attention is now directed to FIG. 5 showing a $\bar{k}$-vector diagram which illustrates diagrammatically the above-mentioned Brillouin four wave mixing process. The directions of the self-generating output beams $\bar{k}_7$, $\bar{k}_8$ and the direction and magnitude of the grating $\bar{k}_8$ are automatically adjusted to fulfill the Bragg matching condition for both input pumping beams $\bar{k}_2$ and $\bar{k}_3$. This, as shown in FIG. 2, results in an offset angle $\Theta$ larger than 0 between each of output beams 7 and 8 and the respective neighbouring pumping beams 4 and 5.

The relationship between changes in $\bar{k}$ and the complex refractive index n as taught in accordance with the present invention, can be expressed by the following expression:

$$\frac{d\bar{k}}{\bar{k}} \approx -\frac{d\lambda}{\lambda} + \frac{dn}{n}\bigg|_{\lambda\text{ constant}} + \frac{dn(\lambda)}{n} \quad (V)$$

wherein $\bar{k}$ is the wave number, $\lambda$ is the wavelength and n is the complex refraction index of which n' and n'' are the real and imaginery components.

It follows from expression (V) that $\bar{k}$ can be modified by changing either or both of n and $\lambda$. The change of $\lambda$ alone, i.e.

$$\frac{d\lambda}{\lambda},$$

is taught by U.S. Pat. No. 4,869,579 and as explained hereinbefore, is in itself lacking sensitivity unless performed with selected conditions in accordance with the present invention as taught herein.

The variation of the refraction index n can be achieved in several ways by varying either or both of the refraction index n' and the absorption index n'', e.g. by applying a D. C. or an A. C. voltage to the third-order, non-linear polarization medium to cause birefringence through the Kerr effect. Pumping beams of orthogonal or tunable polarization would "see" birefringence. Other means or a combination of means may also be used as explained hereinbefore under the heading "Brief Description of the Invention". Such variation of n are reflected in the term $$\frac{dn}{n},$$

of the above expression (V).

The term $$\frac{dn(\lambda)}{n}$$

in expression (V) reflects an alternative mode of operation in which $\lambda$ is so selected that the frequency is substantially near the absorption band edge of the said third-order non-linear polarization medium. As explained hereinbefore, it was found that under such circumstances a relatively small variation of $\lambda$ affects significantly either or both of n' and n'' associated with at least one pumping beam, which gives rise to the formation of a wavenumber difference $d\bar{k}$.

It is known in the art that the refractive index n' is affected by an electrical field through electro-optic effects. One mechanism is the second order electro-optic effect, or Kerr effect, which is mathematically described as follows:

$$\frac{dn'_x}{n'} = \frac{K_e}{n'} E_x^2 \quad (VI)$$

where $n_x$ is the refractive index n' projected in a given direction, $K_e$, is the Kerr coefficient of the medium, $E_x$ is the applied electric field in the same given direction, and $dn_x$ is an incremental change in $n_x$.

Assuming for the sake of a simplified discussion that in expression (V) above the terms $$-\frac{d\lambda}{\lambda} \text{ and } \frac{dn(\lambda)}{n}$$

are zero, then expression (V) becomes $$\frac{dk}{k} = \frac{dn}{n} \quad (V')$$

By replacing in expression (VI)

$$\frac{d\overline{k}}{k} \text{ for } \frac{dn'_x}{n'}$$

there results the expression:

$$\frac{d\overline{k}}{k} = \frac{K_e}{n} E_x^2 \quad (VII)$$

By replacing the right-hand side of the above expression for $$\frac{d\overline{k}}{k}$$

in expression (III) there results the expression:

$$\theta = \frac{2}{\sin\psi} \cdot \frac{K_e}{n} \cdot E_x^2 \quad (VIII)$$

This expression is valid when assuming a small convergence angle $\psi$ as taught herein. For such a situation expression VIII describes the dependence of the steering angle $\Theta$ on the projection $E_x$ of the applied electrical field through the Kerr effect in the direction of the polarization of the incident pumping beams.

Hence, pumping beams of orthogonal or tunable polarization will "see" birefringence, or in other terms the direction of the projection of the applied electric field determines the orientation of the anisotropy and birefringence in the said medium, which in turn affects the input pumping beam in accordance with its polarization.

Attention is now directed to the system of FIG. 6 in which input pumping beams 4 and 5 are shown to have S and P polarizations, respectively, and medium 6 is shown to have a width d. Pumping beams 4 and 5 form an acute convergence angle $\psi$. An electric power supply 14 is applied to medium 6 so as to generate an electric field E which is linked to the applied voltage by the expression $$E = \frac{V}{d}.$$

The intensity and direction of the applied electric field determine the orientation and amount of birefringence of the refractive index n which in this embodiment affects the P-polarized pumping beam 5 to a larger extent than the S-polarized pumping beam 4 and gives rise to an increase dn of the refractive index.

By way of example and still referring to FIG. 6, taking a third-order, non-linear polarization medium in the form of liquid $CS_2$ whose Kerr coefficient $K_e = 1.8 \times 10^{-11}$ esu and assuming a refractive index $n' = 1.6$ and a convergence angle $\psi = \frac{1}{2}°$, the application of a voltage of 24 kV across $d = 100$ μm (which produces an electric field of $8 \times 10^3$ esu), yields a steering angle $\Theta = 10°$. If the $CS_2$ liquid is replaced by nitrobenzene ($C_6H_5NO_2$) having a Kerr coefficient $K_e \approx 1.8 \times 10^{-9}$ esu, the electric field required for achieving the same steering angle is reduced to 800 esu, or an applied voltage of 2.40 kV across $d = 100$ μm.

This, then, is a typical illustration of how the means required in accordance with the invention for steering the output beams over angles in the range of 10° are considerably easier to achieve than in accordance with U.S. Pat. No. 4,869,579.

Another possible mechanism would involve the linear electro-optic effect which obeys the formula:

$$\frac{dn'}{n'} \approx \frac{n'^2 \cdot r \cdot E}{2}$$

where r is the electro-optic coefficient. This would be applicable in many types of media including, but not limited to, photorefractive crystals, liquid crystals and other poled materials.

Attention is now directed to the term $$\frac{dn(\lambda)}{n}$$

in expression (V). It was found that by so selecting the wavelength $\lambda$ of the input pumping beams that their frequencies are near the resonant band edge of the medium, then small wavelength difference $d\lambda$ cause significant changes of n associated with either or both pumping beams, which in turn affects $\Theta$. The resonant bands are known for most, if not all, of the Kerr active media, and there is no need for extensive experimentation in order to select the desired wavelength for operating in accordance with this embodiment. For example, in the case of $CS_2$ the band edge wavelength is of the order of 400 nm. In such a setup, small variation in $\lambda$ of about 2 nm will significantly affect $\Theta$.

As already mentioned, one aspect of the invention, which follows from the relationship between $d\Theta$ and $$\frac{dk}{k}$$

which in accordance with the invention was found to obey the expression (III) herein, makes it possible to use small acute convergence angles $\psi$. A small convergence angle in turn makes it possible that both input pumping beams impinge one and the same side of a medium cell and thus gives rise to a so-called reflection grating as distinct from a so-called transmission grating which occurs when, as a result of large convergence angle $\psi$, the two incident pumping beams impinge on different sides of the medium cell.

It has been found in accordance with the present invention that a small convergence angle $\psi$, i.e. a reflection grating, is very sensitive to wavenumber difference $d\overline{k}$, and that such small changes are capable of producing a larger offset angle $\Theta$ than the same $d\overline{k}$ would produce in the case of a large convergence angle $\psi$. By way of illustration, in case of a convergence angle $\psi = 1.3°$ it was found that a given $d\overline{k}$ achieved, for example, by changing $\lambda$, produces a change of the offset angle $\Theta$, i.e. a $d\Theta$ that is about $10^3$ times larger than the $d\Theta$ achieved with the same $d\lambda$ in case of a convergence angle of 173° which is a typical case disclosed in U.S. Pat. No. 4,869,579.

Another significant advantage is realized with a reflection grating. This relates to the beam deflection access time, or the time it takes to angularly move a beam from one spot to another. For acousto-optic devices, a transmission grating is operative. In this geometry, the grating sweeps across the beam diameter. Therefore, the access time t is limited to the time it takes for a point on the grating to traverse the beam diameter, so that t=d/v where d is the beam diameter and v is the acousto grating velocity. Practically, this limits the minimuma access time to between 1–10 μs. In a reflection grating geometry such as can be operative in stimulated Brillouin and certain photorefractive, as well as other types of wave mixing, this geometrical time limitation does not exist, and the minimum access time is limited by the material response time, or grating build-up time. In stimulated Brillouin wave mixing, for example, this time is between 1–100 ns.

Attention is again directed to FIGS. 1 and 2 which concern the specific case of the same $\lambda$ for both pumping beams in which case at the start $\Theta=0$. In a specific set-up the two pumping beams 4 and 5 produced by Nd:YAG laser sources 2 and 3 have the same wavelength of $\lambda=1.06$ μm and the arrangement comprises a medium cell 20 cm long (l=20 cm) holding $CS_2$. In order to prevent coherent superposition and combined Stimulated Brillouin Scattering (SBS) phase locking grating, and to facilitate tracking the source of the output beams by way of their polarization, the pumping beams had different polarizations with beam 4 being S-polarized and beam 5 being P-polarized. This tracking capability, the so-called polarization "encoding" technique, enables to identify corresponding pairs of output and input beams and thereby to determine readily whether the actual observed steering angle is in agreement with expectation.

In order to overcome distortion in the diverging output beams 7 and 8, pumping beam 4 was slightly focused by a lens 9 having focal length f=100 cm.

The arrangement of FIG. 2 also comprises a wavelength shifter 13 associated with laser beam 4, typically an SBS cell filled with $CCl_4$, $CS_2$ or benzene, a splitter 10 and a detector 12. The set-up in FIG. 2 is for the purpose of a feasibility study only and in actual practice the shifter cell 13 will be replaced by continuously or intermittently variable steering means, e.g. electro-optical means such as a laser diode.

In the set-up of FIG. 2 the wavelength $\lambda$ of beam 4 is shifted to $\lambda'$ by means of shifter 13 before it is directed to the third-order, non-linear polarization medium 6. The steered output beams 7 and 8 emerge from the said medium with a steering angle $\Theta$. The polarization beam splitter 10 routes S-polarized output beam 7 towards detector 12.

Figure 4:
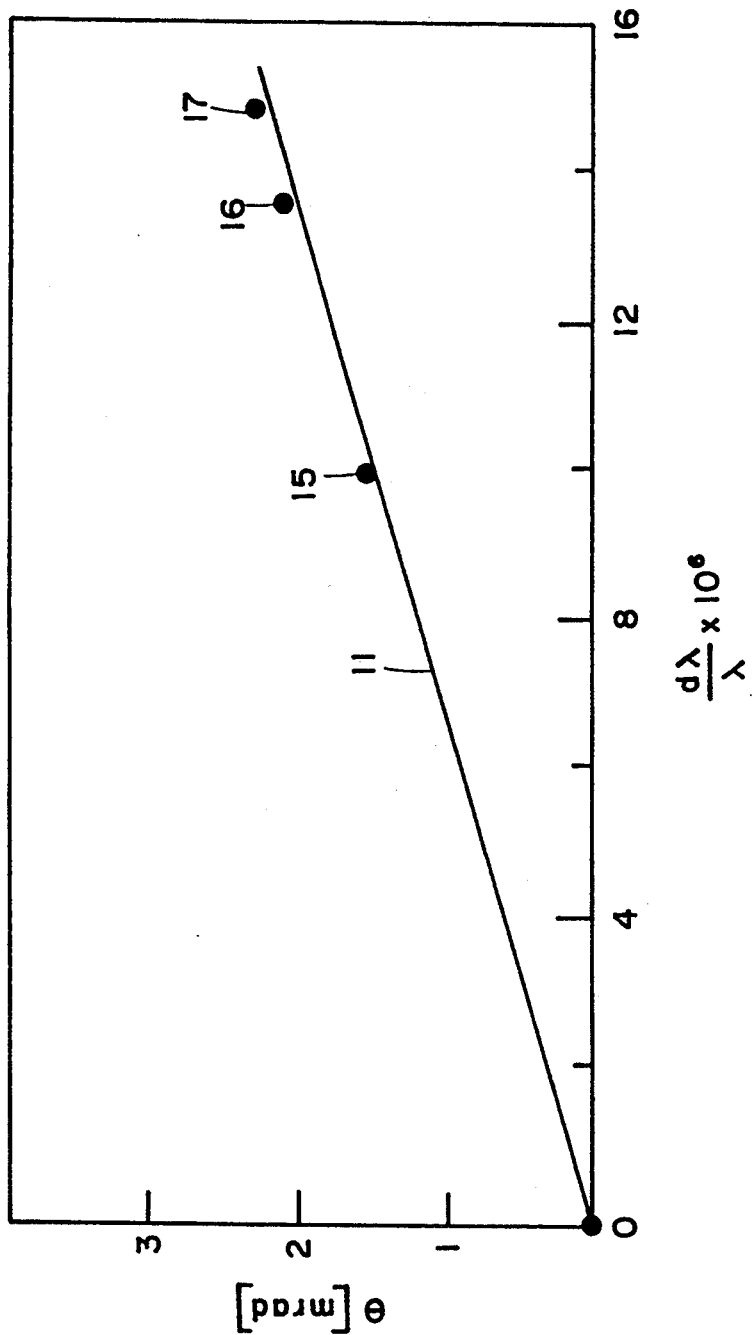
FIG. 4 is a sensitivity graph showing the steering angle $\Theta$ as a function of $$\frac{d\lambda}{\lambda},$$

Attention is now directed to FIG. 4 which is a sensitivity graph in which the deflection angle $\Theta$ is plotted against $$\frac{d\lambda}{\lambda}$$

for a given convergence angle $\psi=1.3°$. The abscissa presents $$\frac{d\lambda}{\lambda} \times 10^6$$

and the ordinate presents the steered output angle $\Theta$ in mr units and the sensitivity is defined as $$\frac{\theta}{d\lambda/\lambda}.$$

The theoretical linear mutual relationship (formula III) is presented by the straight line 11, whilst markings 15, 16 and 17 are the (X,Y) values actually obtained in three different experiments in which the shifter cell 13 was filled with, respectively, $CCl_4$, $CS_2$ and benzene. It was shown that the (X,Y) rates of markings 15, 16 and 17 are $(9.9 \times 10^{-6}; 1.45 \text{ mr})$, $(13.4 \times 10^{-6}; 1.96 \text{ mr})$ and $(14.7 \times 10^{-6}; 2.16 \text{ mr})$, respectively. The divergence of these values from the theoretical line 11 is in the range of 5–9% which is considered to be in excellent agreement with the theory.

FIG. 4 shows that in the particular set-up concerned, the sensitivity is 252 rad. while in accordance with U.S. Pat. No. 4,869,579 the sensitivity was only 0.26 rad., i.e. by 3 orders of magnitude smaller.

The results of the measurements performed in the set-up of FIG. 2 with no deflection ($\Theta=0$) and with deflections achieved by different media in the shifter 13, which are graphically represented by markings 15, 16 and 17 in FIG. 4, are shown in FIGS. 3a, 3b, 3c and 3d respectively. As shown, on a Centimeter Partitioned scale indexed 0–3 the first measurement was by definition at point 1.95 cm (no deflection), the second at about 1.3 cm, the third at about 1.09 cm and the fourth at nearly 1.

It was further found that with the set-up of FIG. 2, laser beams of an intensity of 20 mJ with a single longitudinal mode of 15 ns pulses and thus having a power per pulse of about 1 MW, will be successfully steered with a significantly improved sensitivity. By way of example a steering angle $\Theta$ of 10° is achieved for $$\frac{d\lambda}{\lambda}$$

less than $7 \times 10^{-4}$. Such steering of high power pumping beams with a variation in $\lambda$ less than 0.1% is significantly better than the steering angle obtained in accordance with the prior art (Refs. 9 and 10). Apart from the very fact that the simple way in which such high power input beams can be steered over large angles in accordance with the invention constitutes a significant advantage per se, it is also noteworthy that in accordance with the prior art the high power pumping beams are liable to damage the media that were used while the media selected by criteria taught in accordance with the present invention are not damaged. Typically, media that meet the criteria according to the invention exhibit stimulated Brillouin scatter and have a high damage threshold and fast time response. Such media may be solid, liquid or gaseous, a typical example being $CS_2$, $CCl_4$, $TiCl_4$, nitrobenzene $GeCl_4$, $SnCl_4$, $PCl_3$, $D_2O$, $SiCl_4$, various fluorinated hydrocarbons known as FREON ™, liquid crystals, $CH_4$, $SF_6$ and glass.

Besides the steering angle, another important parameter is the number of resolvable steering points N. It has been found that the resolution N depends upon $\psi$ and the angular divergence of the input beams $\delta\psi$. Typical volumes of N are between 100 and 1,000. Furthermore, the product of $N.\delta\psi$ is maximum for $\psi=90°$ when $$\frac{d\bar{k}}{\bar{k}} < 1.$$

I claim:

1. A method of deflecting and steering laser beams that comprises generating two converging pumping beams defining between them a convergence angle $\psi$, targeting said two converging pumping beams on a predetermined intersection region of a third-order, non-linear polarization medium so as to intersect therein whereby each of said pumping beams is split in said intersection region to form a plurality of scattered portions each of which interferes with the pumping beam from which it was formed to generate a light interference pattern, the light interference patterns thus generated from said two pumping beams causing self-generation of a common grating such that there emerge from said polarization medium two output beams each forming with a neighboring pumping beam a steering angle $\Theta$ which is controllable by variation of the magnitude of the wavenumber of at least one of said two pumping beams so as to form a wavenumber difference dk between said two pumping beams; wherein said wavenumber difference is obtained by the controlled variation of at least one of a refractive index n' and absorption index n" associated with at least one of the pumping beams.

2. A method according to claim 1, wherein the wavenumber difference is obtained from the variation of both of n' and n" associated with one pumping beam.

3. A method according to claim 1, wherein the wavenumber difference is obtained from the variation of both of n' and n" associated with both pumping beams.

4. A method according to claim 1, wherein the variation of both of n' and n" is achieved by the application of an electric field to the said third-order non-linear polarization medium.

5. A method according to claim 1, wherein the variation of both of n' and n" is achieved by the application of a magnetic field to the said third-order non-linear polarization medium.

6. A method according to claim 1, wherein the variation of both of n' and n" is achieved by changing the polarization of one pumping beam relative to the other.

7. A method according to claim 1, wherein the variation of both of n' and n" is achieved by changing the light intensity of one pumping beam relative to the other.

8. A method according to claim 1, wherein the variation of both of n' and n" is achieved by the application of a stress to the said third-order non-linear polarization medium.

9. A method according to claim 1, wherein the wavelength of the pumping beams is so selected that the frequency thereof is substantially near the resonance band edge of said third-order, non-linear polarization medium and a wavenumber difference $d\bar{k}$ is formed by a wavelength shift of at least one of the pumping beams to give rise to a small wavelength difference $d\lambda$ between the two pumping beams.

10. A method for deflecting and steering laser beams of the kind that comprises generating two converging pumping beams defining between them a convergence angle $\psi$, targeting said two converging pumping beams on a predetermined region of a third-order, non-linear polarization medium so as to intersect therein whereby each of said input pumping beams is split in the said intersection region to form a plurality of scattered portions each of which interferes with the pumping beam from which it was formed to generate a light interference pattern, the light interference patterns thus generated from the said two pumping beams causing self-generation of a common grating such that there emerge from said polarization medium two diverging output beams each forming with a neighbouring pumping beam a steering angle $\Theta$ which is controllable by variation of the magnitude of the wavenumber of at least one of said two pumping beams with respect to the magnitude of the wavenumber of the other pumping beam so as to form a wavelength shift to produce a wavelength difference $d\lambda$ and thereby a wavenumber difference $d\bar{k}$ between the two pumping beams, characterized in that said convergence angle $\psi$ is acute and the wavelength shift does not exceed 0.5%.

11. A method according to claim 10, characterized in that said convergence angle $\psi$ is of the order of 10° and the wavelength difference does not exceed 0.1%.

12. A method according to claim 1 serving for high power beam steering, wherein said third-order, non-linear polarization medium is characterized by a high damage threshold value and a fast time response.

13. A method according to claim 12, wherein the medium is selected from the group of stimulated Brillouin active media.

14. A method according to claim 12, wherein the medium is selected from the group of photorefractive media.

15. A method according to claim 12, wherein the medium is selected from the group of $CS_2$, $CCl_4$, $TiCl_4$, nitrobenzene $GeCl_4$, $SnCl_4$, $PCl_3$, $D_2O$, $SiCl_4$, various fluorinated hydrocarbons known as FREON ™, liquid crystals, $CH_4$, $SF_6$ and glass.

16. A method according to claim 1, wherein at least one of the said conversion pumping beams carries spatial and temporal light modulations at least portion of which is also carried by at least one of said output beams.

17. A method according to claim 16, wherein the color of the output beam carrying said spatial modulation is that of its mate input pumping beam.

18. A method according to claim 1, wherein the wavenumber difference is obtained from the variation of one of the refractive index n' and absorption index n" associated with one pumping beam.

19. A method according to claim 1, wherein the wavenumber difference is obtained from the variation of one of the refractive index n' and absorption index n" associated with both pumping beams.

20. A method according to claim 1, wherein the variation of one of the refractive index n' and absorption index n" is achieved by the application of an electric field to the said third-order non-linear polarization medium.

21. A method according to claim 1, wherein the variation of one of the refractive index n' and absorption index n" is achieved by the application of a magnetic field to the said third-order non-linear polarization medium.

22. A method according to claim 1, wherein the variation of one of the refractive index n' and absorption index n" is achieved by changing the polarization of one pumping beam relative to the other.

23. A method according to claim 1, wherein the variation of one of the refractive index n' and absorption index n" is achieved by changing the light intensity of one pumping beam relative to the other.

24. A method according to claim 1, wherein the variation of one of the refractive index n' and absorption index n" is achieved by the application of a stress to the said third-order non-linear polarization medium.

* * * * *